F. WOLFENDEN.
COOKER FOR OIL BEARING MEAL AND THE LIKE.
APPLICATION FILED APR. 8, 1911.
1,012,312.
Patented Dec. 19, 1911.
3 SHEETS—SHEET 1.
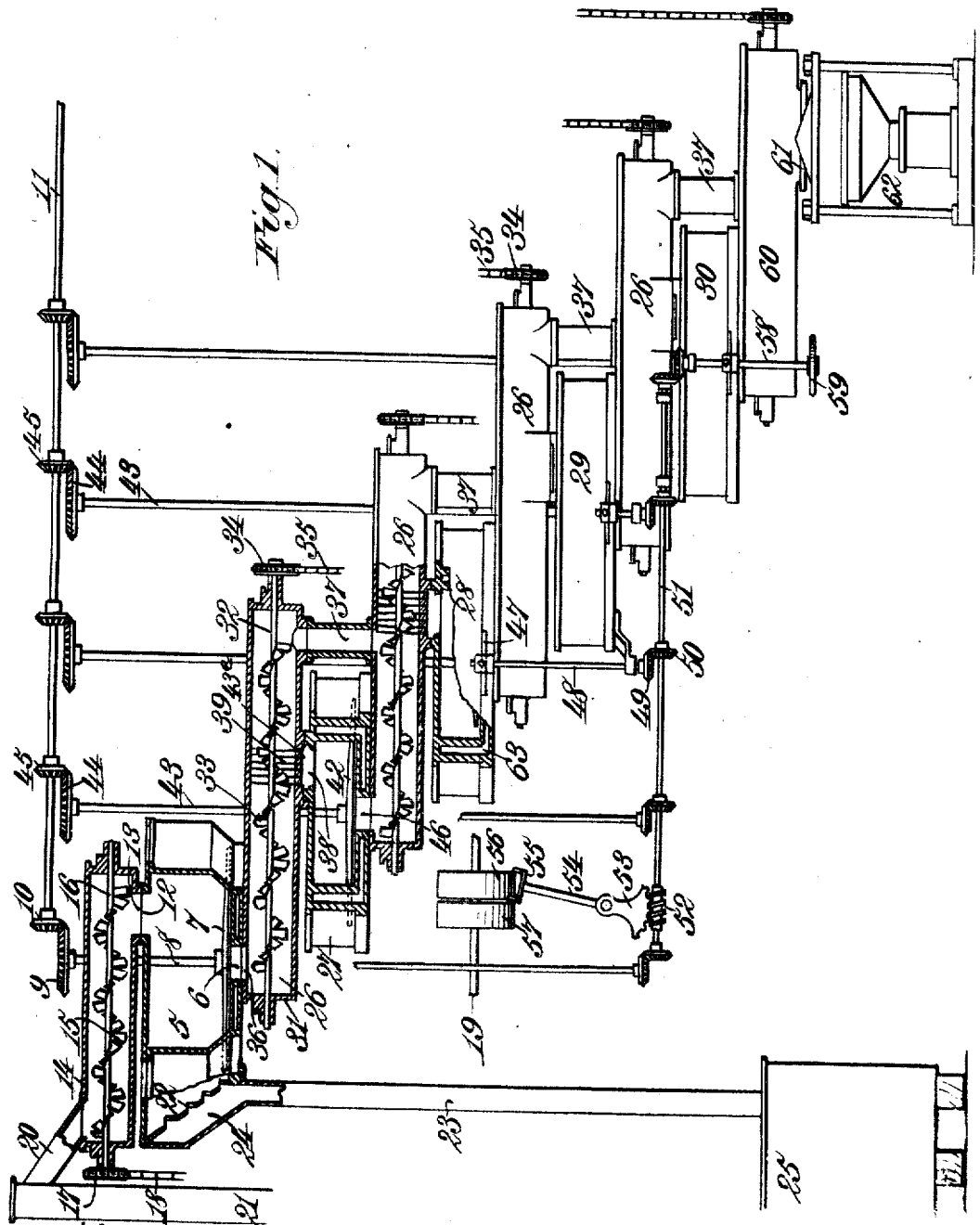

F. WOLFENDEN.
COOKER FOR OIL BEARING MEAL AND THE LIKE.
APPLICATION FILED APR. 8, 1911.
1,012,312.
Patented Dec. 19, 1911.
3 SHEETS—SHEET 2.
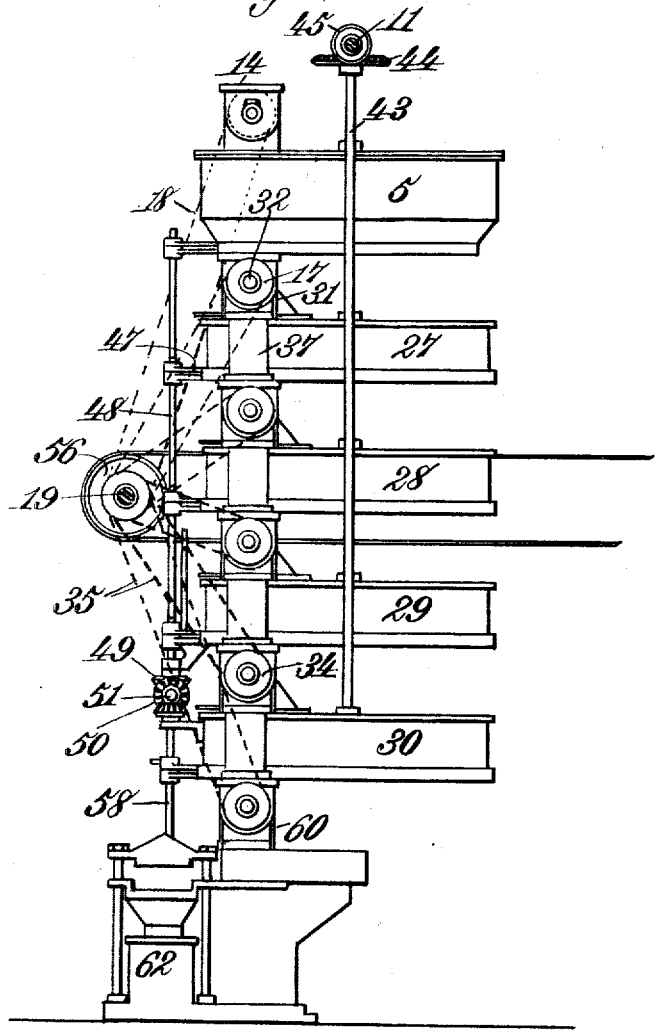
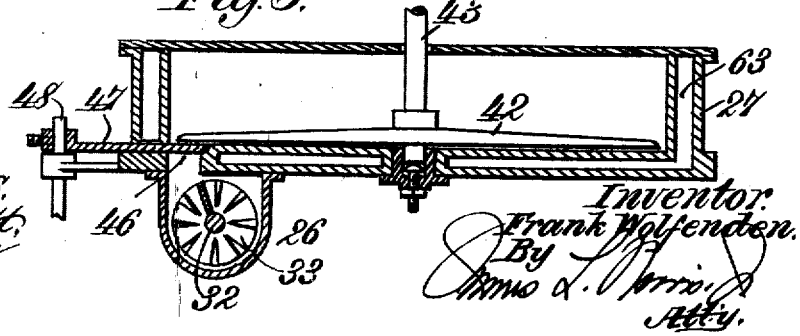

F. WOLFENDEN.
COOKER FOR OIL BEARING MEAL AND THE LIKE.
APPLICATION FILED APR. 8, 1911.
1,012,312.
Patented Dec. 19, 1911.
3 SHEETS—SHEET 3.
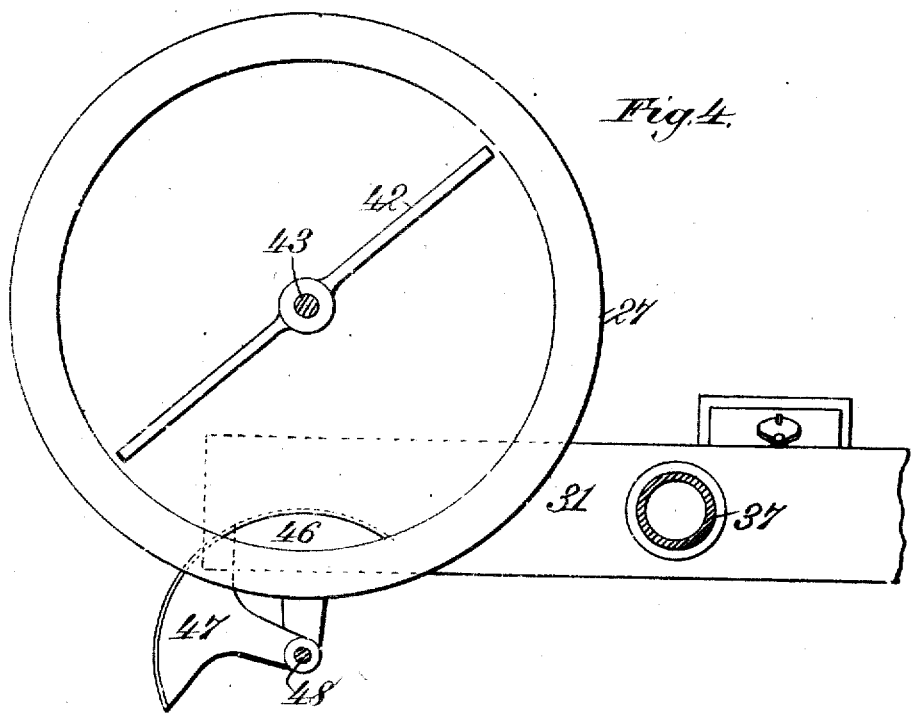
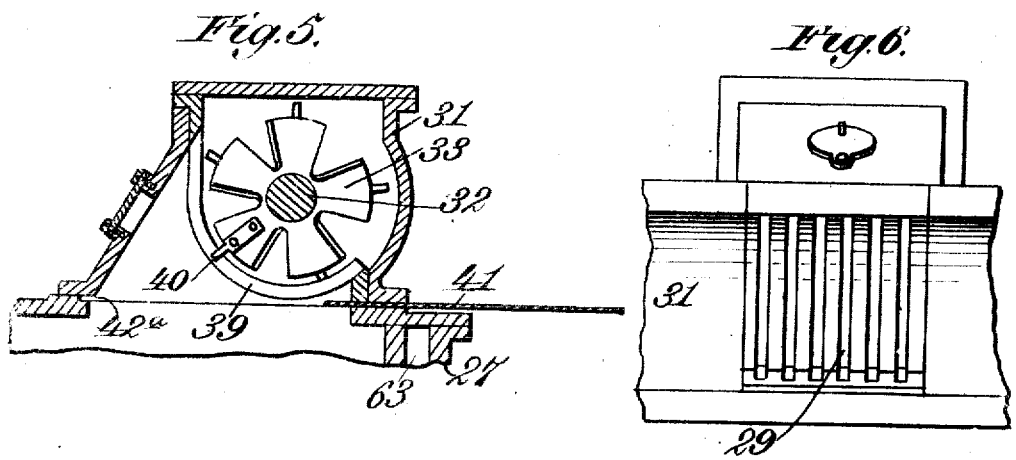
Witnesses.
Inventor.
Frank Wolfenden.
By
Atty.

UNITED STATES PATENT OFFICE.

FRANK WOLFENDEN, OF WEST POINT, MISSISSIPPI.

COOKER FOR OIL-BEARING MEAL AND THE LIKE.

1,012,312.

Specification of Letters Patent. Patented Dec. 19, 1911.

Application filed April 8, 1911. Serial No. 619,876.

*To all whom it may concern:*

Be it known that I, FRANK WOLFENDEN, a citizen of the United States, residing at West Point, in the county of Clay and State of Mississippi, have invented new and useful Improvements in Cookers for Oil-Bearing Meal and the Like, of which the following is a specification.

This invention relates to steam cookers or kettles and more particularly to the kind employed in oil mills for cooking or heating the oil bearing meal preparatory to expressing the oil therefrom. These cookers usually comprise a series of steam jacketed kettles or vessels in which the meal is cooked, and the meal is drawn from the last kettle into the cake former for molding the meal into cakes suitable for insertion into the oil press. As ordinarily operated, the meal is partially cooked in one kettle and then discharged into the next kettle of the series where the cooking is continued, this operation being repeated until the meal reaches the last kettle in which the cooking is completed.

One object of the present invention is to produce a steam cooker of the class specified which will insure uniformity of cooking and an improved quality of meal, and having combined beaters and conveyers interposed between the cooking kettles to effectively and automatically control the discharge of the meal from one kettle to the next so as to maintain a certain quantity of meal in each kettle practically constant and to regulate the length of time the meal remains in each kettle.

A further object of the invention is to provide a steam cocker for oil bearing meal and the like embodying a plurality or series of steam jacketed kettles arranged in receptive sequence and provided with by-passages whereby the material may be diverted from any kettle should the latter be in inoperative condition and thereby permit the remaining portion of the apparatus to operate without interruption.

A still further object of the invention is to provide a steam cooker of the class specified having cooking kettles arranged in receptive sequence and provided with discharge gates or outlet means having mechanism operating therewith to prevent the formation of "water balls" in any of the kettles by the passage of the meal from one kettle to the other and also to maintain the discharge gates or openings clear to obviate clogging or choking of the same.

With these and other objects and advantages in view the invention consists in the construction and arrangement of the several parts and mechanisms hereinafter more fully described and claimed in preferred form.

An embodiment of the invention to illustrate one practical adaptation thereof is shown in the accompanying drawings, and in the latter:

Figure 1 is a sectional side elevation of a cooker or apparatus embodying the features of the invention, the plane of the section of the overflow means at the upper left-hand portion of the figure being farther rearwardly than the section of the adjacent receiver and its discharge opening. Fig. 2 is an end elevation of the cooker or apparatus. Fig. 3 is a transverse vertical section through one of the kettles and a portion of one of the combined beaters and conveyers. Fig. 4 is a top plan view of one of the kettles and a portion of one of the intermediate conveyers illustrating one of the by-passages in horizontal section. Fig. 5 is a transverse vertical section through one of the intermediate conveyers taken at the point of communication of the latter with a kettle and showing the controlling slide or valve for the opening as being drawn outwardly. Fig. 6 is a top plan view of a portion of one of the conveyer casings showing the top removed to illustrate the position of the grate at the discharge opening or outlet.

The numeral 5 designates a receiver consisting of a suitably inclosed chamber or receptacle having a bottom discharge opening 6, a combined conveyer and beater 7 therein provided with an operating shaft 8 extending vertically therethrough with a gear 9 on the upper end thereof in mesh with a pinion 10 fixed on a suitable shaft 11 driven by power at a distance from the cooker or apparatus. The receiver 5 is also formed with an inlet opening 12 in the top portion in communication with a discharge opening 13 of a conveying means 14 embodying an inclosing casing with a conveyer 15 extending centrally therethrough and including a shaft 16 having a sprocket wheel or other analogous driving device 17 on one end with a belt 18 trained thereover and over a similar driving device on a line shaft 19. At the top portion of the extremity of the conveying means 14 opposite that having the discharge opening 13 therein, a feeding chute or conduit 20 is attached and also communicates with the upper extremity of a suitable elevator 21 which is supplied with ground cotton seed meal or other material to be cooked from a suitable source. The receiver 5 is further provided with overflow means consisting of a plurality of openings 22 at different elevations in communication with a discharge chute 23 leading from a discharge chamber 24 adjacent to said openings, the said chute 23 extending downwardly to and opening into the top of a suitable reserve bin 25. The object of the openings 22 or the provision of means to take care of the overflow is to prevent choking or stalling of the receiver and backing-up of the meal in the conveyer means 14 in the event of a too rapid feed and also to maintain an approximately uniform quantity of the meal discharged from the opening 6 into the conveyer 26 of the first heating kettle or chamber 27, there being three similar kettles 28, 29 and 30 in addition to the kettle 27 arranged in receptive sequence and each having thereover a conveyer similar in all respects to the conveyer 26 and embodying an inclosing casing 31, and a conveyer shaft 32 with open spiral conveying blades 33 thereon and an end sprocket 34 engaged by a belt 35 which is trained over an analogous device on and driven from the line shaft 19. Each conveyer 31 also has an inlet opening 36 adjacent to one end at the top portion thereof and a by-passage 37 communicating with the lower portion adjacent the opposite end thereof. Each conveyer 31 has an intermediate discharge opening or outlet 38 covered by a grate 39 extending around interiorly of the casing 31 and of a curved or basket type. The conveyer blades or projections 33 adjacent to the grates 39 have projecting fingers 40 thereon which move between the grate bars and break up any water balls that may be formed and fed forward to the grates and thus obviate the passage of any unheated or uncooked meal from one conveyer or conveying means into the adjacent kettle or from the latter into the next succeeding conveying means.

A suitable slide valve or cut-off plate 41, see Fig. 5, is mounted in suitable guide-ways 42ª between the discharge opening or outlet 38 and the inlet opening 43ª respectively of each conveyer or conveying means and kettle, the said slide valves or cut-off plates being manually operative to shut off communication of any kettle with its feeding conveyer or conveying means in the event that said kettle for some reason becomes inoperative or impaired, and in this event the conveyer or conveying means so shut off discharges its meal or the material conveyed around the cut-out kettle through the medium of the by-passage 37 communicating therewith and also with the next conveyer or conveying means without requiring the entire cooker or apparatus to be thrown out of commission or caused to cease operation.

Each kettle 27 has a combined heater and feeder or conveyer 42 therein, and a shaft 43 extends downwardly through each kettle and has the beater and conveyer 42 secured thereon, rotary movement being imparted to the shaft 43 through the medium of a gear 44 on the upper end thereof meshing with a pinion 45 on the shaft 11. The shafts 43 differ in length in accordance with the distance the kettles are located below the shaft 11 and likewise the belts 35 differ in length proportionate to the distance of the shafts 32 and sprocket wheels 34 from the shaft 19. The bottom of each kettle is formed with a discharge or outlet opening 46 which communicates with the upper portion of one end of each conveyer or conveying means in a manner similar to the discharge opening 6 of the receiver 5, and the discharge openings 6 and 46 are controlled as to their open and closed condition by segmental valves 47, see Fig. 4, fixed to shafts 48 having pinions 49 on their lower ends held continually in mesh with corresponding pinions 50 on an actuating shaft or operating rod 51, the shafts 48 differing in length in accordance with the distance the cut-off valves or controlling means 47 are located from the shaft 51. The shaft 51 also has a worm 52 fixed thereon and continually engaged by a toothed head 53 forming part of an intermediately fulcrumed belt-shifting lever 54 having a belt engaging yoke 55 at its upper end to move a driving belt relatively to a fast pulley 56 and a loose pulley 57 on the shaft 19. The toothed head 53 and shifting lever 54 are operated through the worm 52 by the shaft or rod 51 at the same time or simultaneously with the operation of the valves or controlling means 47 and the actuation of the shaft 51 is controlled through the medium of a countershaft or rod 58 supported in suitable bearings adjacent to the lowermost shaft 48 and is practically a continuation of the latter, the shaft 58 having a turn-head or hand-wheel 59 on its lower end for manual operation and by means of which all of the valves 47 may be simultaneously opened or closed and the belt shifted from the loose pulley 57 to the fast pulley 56 to synchronously operate all of the conveyers or conveying means of the kettles and the receiver.

Below the lowermost kettle 30 a conveyer 60 is arranged and is in all respects similar to the conveyers or conveying means heretofore described except that it is without the by-passage 37 and the use of the grate 39 therein may be dispensed with. The conveyer or conveying means 60 has communication at its lower portion, as at 61, with the upper or feed extremity of a suitable cake former 62.

It will be understood that the receiver and kettles will be provided with suitable steam jackets or heating means 63 that in practice will be connected up to a suitable heating source or steam supply by any approved means. It will also be understood that a frame of any desirable or requisite form will be used in supporting the conveyers, kettles and receiver together with the coöperating mechanisms in practical association. It will also be understood that the number of kettles and conveying means used may be varied indefinitely, or a less number employed than shown in the accompanying drawings.

From the foregoing the operation will be readily understood, but to render the same clear it will be briefly described as follows: The meal or other material entering the conveying means or feeder 14 passes into the receiver 5 and is agitated by the combined beater and feeder 7 and after remaining in the receiver for a certain length of time it is discharged through the bottom outlet 6 into the conveyer or conveying means 26 and from the latter is delivered through the first grade 39 and outlet 38 into the kettle 27, and so on throughout the whole series of conveyers and kettles until it reaches the last kettle 30 whence it passes into the conveyer 60 and then into the former 62. Under normal conditions, when all of the kettles are working the quantities of meal delivered into each kettle will be approximately uniform, and as hereinbefore explained, if any kettle is cut out through the closure of any one of the slides or slide valves 41, the meal or other material treated will be delivered from the conveyer or conveying means above the cut out kettle to the conveying means or conveyer next below the kettle through the by-passage connecting the conveying means, and in some instances when all the kettles are working or in operation a portion of the meal or other material will be carried over the grates and pass through the passages between the conveying means and thus obviate any tendency to clogging or choking the grates. At any time desired the cut-offs 47 may be simultaneously operated to close the receiver and the kettles and discontinue communication between the receiver and kettles and the conveying means and simultaneously check or stop the motion of the conveying means. The combined beaters and conveyers 7 and 42, and particularly the beaters and conveyers 42, may be thrown out of commission or operation by shifting the pinions 45 on the shaft 11 or moving the gears 44 and 9 downwardly on the shafts 43 and 8, the said pinions and gears being provided with fastening or set means relatively to their shafts that may be loosened for the purpose just stated.

The improved cooker or cooking apparatus will be found exceptionally useful for the purpose for which it has been devised, and changes in the proportions and dimensions of the several parts may be adopted without departing from the spirit of the invention.

What is claimed as new is:

1. The combination of a plurality of heating kettles arranged in descending series and having discharging openings at the bottom thereof and a corresponding plurality of conveyers arranged over and having bottom communication with the kettles and provided with means for breaking up lumps or water balls at the points of communication between the kettles and conveyers.

2. The combination of a plurality of heating kettles arranged in descending series and having openings at the bottom thereof for discharging the material, a corresponding plurality of conveyers arranged over the top portions of the kettles and having communicating openings with the latter, grates disposed in the communicating openings between the conveyers and kettles, and means carried by the conveyers for operating with the grates to break up lumps or water balls.

3. The combination of a plurality of heating kettles, a corresponding plurality of conveyers arranged between the kettles and having communication with the top and bottom portions of the latter in descending series, and means for shutting off communication between the several kettles and conveyers and for maintaining communication between the conveyers so as to cut out any kettle that may become impaired without causing cessation of operation of the remaining kettles and conveyers.

4. The combination of a plurality of heating kettles arranged in descending series and having top inlet openings and bottom discharge openings, rotary agitators and conveyers within the kettles, a plurality of conveyers having communication with the inlet and outlet openings of the kettles and with each other exteriorly of the kettles, and means for manually cutting out any one of the kettles without causing cessation of operation of the remaining kettles and the conveyers.

5. The combination of a plurality of heating kettles arranged in descending series and having discharging openings at the bottom thereof and top inlet openings, valve controlling means operative from a single point, valves operatively associated with the discharge openings of the kettles and connected to said valve controlling means for simultaneous operation, conveyers having rotatable conveying devices operative by the said valve controlling means to simultaneously set the same in motion or cause cessation of operation thereof synchronously with the opening and closing of the said valves.

6. The combination of a plurality of heating kettles arranged in descending series, a corresponding plurality of conveyers communicating with the bottom and top portions of the kettles, a receiver in communication with the uppermost conveyer and provided with overflow outlets at varying elevations, means for supplying the receiver with material to be treated, and means for conveying the overflow away from the receiver.

7. The combination of a plurality of heating kettles arranged in descending series, a corresponding plurality of conveyers having communication with the top and bottom portions of the kettles and interposed between the latter in part and also above and below the first and last kettle respectively, means for supplying the first receiver with material to be treated, and a cake former having communication with the last conveyer.

8. The combination of a plurality of heating kettles arranged in descending series and having top inlets and bottom outlets, valves movably associated with the bottom outlets of the kettles, conveyers interposed between the intermediate kettles and respectively above and below the first and last kettle of the series and having communication with the top inlets and bottom outlets and also provided with movable conveying means, and mechanism for simultaneously opening and closing the said valves and simultaneously starting and stopping the conveying means.

In testimony whereof I have hereunto set my hand in presence of two subscribing witnesses.

FRANK WOLFENDEN.

Witnesses:
 GEO. F. HEARD,
 JACOB KASER.